(12) United States Patent
Dias Da Cruz et al.

(10) Patent No.: US 11,718,255 B2
(45) Date of Patent: Aug. 8, 2023

(54) SYSTEM AND METHOD FOR RADAR-BASED DETERMINATION OF A NUMBER OF PASSENGERS INSIDE A VEHICLE PASSENGER COMPARTMENT

(71) Applicant: IEE INTERNATIONAL ELECTRONICS & ENGINEERING S.A., Echternach (LU)

(72) Inventors: Steve Dias Da Cruz, Mertert (LU); Hans-Peter Beise, Perl (DE); Una Karahasanovic, Trier (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 552 days.

(21) Appl. No.: 16/630,778

(22) PCT Filed: Jul. 13, 2018

(86) PCT No.: PCT/EP2018/069065
§ 371 (c)(1),
(2) Date: Jan. 13, 2020

(87) PCT Pub. No.: WO2019/012099
PCT Pub. Date: Jan. 17, 2019

(65) Prior Publication Data
US 2021/0146867 A1    May 20, 2021

(30) Foreign Application Priority Data

Jul. 13, 2017 (LU) ................................. LU100338
Sep. 21, 2017 (LU) ................................. LU100451

(51) Int. Cl.
*B60R 21/015* (2006.01)
*G01S 7/35* (2006.01)
*G01S 13/56* (2006.01)

(52) U.S. Cl.
CPC .......... *B60R 21/0153* (2014.10); *G01S 7/354* (2013.01); *G01S 13/56* (2013.01); *B60R 21/01534* (2014.10); *G01S 7/356* (2021.05)

(58) Field of Classification Search
CPC .......... B60R 21/0153; B60R 21/01534; G01S 7/354; G01S 13/56; G01S 7/356
See application file for complete search history.

(56) References Cited

U.S. PATENT DOCUMENTS

| 2002/0003345 | A1 | 1/2002 | Stanley et al. | |
| 2005/0046584 | A1* | 3/2005 | Breed ................. | G08B 29/181 340/13.31 |

(Continued)

FOREIGN PATENT DOCUMENTS

| CN | 1978252 A | 6/2007 |
| CN | 101743147 A | 6/2010 |

(Continued)

OTHER PUBLICATIONS

Olhede S. and Walden A. T. 2004The Hilbert spectrum via wavelet projectionsProc. R. Soc. Lond. A.460955-975. (Year: 2004).*

(Continued)

*Primary Examiner* — Timothy A Brainard
*Assistant Examiner* — Ismaaeel A. Siddiquee
(74) *Attorney, Agent, or Firm* — Reising Ethington P.C.

(57) ABSTRACT

A method of operating a radar sensor system for determining a number of passengers in a vehicle passenger compartment. The radar sensor system includes at least one radar transmitting antenna and at least one radar receiving antenna and an evaluation and control unit for evaluating Doppler information from the received radar waves. The method includes: transmitting radar waves towards the vehicle passenger compartment; receiving radar waves reflected by a passenger or by passengers being present in the vehicle passenger (Continued)

compartment; generating received radar signals from the received radar waves; mathematically decomposing the received radar signals into a plurality of received signal components; providing values of the received signal components regarding a characteristic parameter to a classifier trained with a plurality of scenarios; identifying one of trained scenarios, based on the provided values; and generating an output signal indicative of the identified scenario.

9 Claims, 3 Drawing Sheets

(56) References Cited

U.S. PATENT DOCUMENTS

| | | | |
|---|---|---|---|
| 2008/0077015 A1* | 3/2008 | Boric-Lubecke | G01S 13/888 600/453 |
| 2010/0305816 A1 | 12/2010 | Orlewski | |
| 2012/0143786 A1 | 6/2012 | Karner | |
| 2016/0001728 A1 | 1/2016 | Schrabler et al. | |
| 2016/0200276 A1 | 7/2016 | Diewald | |
| 2016/0311388 A1 | 10/2016 | Diewald | |
| 2017/0166086 A1 | 6/2017 | D'Addetta et al. | |
| 2017/0282828 A1 | 10/2017 | Carenza et al. | |
| 2018/0170213 A1 | 6/2018 | Lu-Dac et al. | |
| 2019/0178980 A1* | 6/2019 | Zhang | A61B 5/7267 |

FOREIGN PATENT DOCUMENTS

| | | |
|---|---|---|
| CN | 102542619 A | 7/2012 |
| CN | 104968536 A | 10/2015 |
| CN | 105980216 A | 9/2016 |
| JP | 2012225825 A | 11/2012 |
| WO | WO2015022358 A1 | 2/2015 |
| WO | WO2015140333 A1 | 9/2015 |
| WO | WO2016038148 A1 | 3/2016 |

OTHER PUBLICATIONS

T. Zhangi, G. Valerio, J. Sarrazin and D. Istrate, "Wavelet-based analysis of 60 GHz Doppler radar for non-stationary vital sign monitoring," 2017 11th European Conference on Antennas and Propagation (EUCAP), 2017, pp. 1876-1877, doi: 10.23919/EuCAP. 2017.7928689. (Year: 2017).*
Chinese Office Action in English corresponding to Chinese Application No. 201880046547.1, dated Jan. 7, 2022, 16 pages.
D.B. Percival et al., "Wavelet Methods for Time Series Analysis", Cambridge Series in Statistical and Probabilistic Mathematics, Cambridge University Press, p. 62, paragraph 0019, (2000).
T. Zhang et al., "Wavelet-based analysis of 60 GHz Doppler radar for non-stationary vital sign monitoring", 11th European Conference on Antennas and Propagation (EUCAP) IEEE, (2017).
T. Zhang et al., "Non-Contact Estimation at 60 GHz for Human Vital Signs Monitoring Using a Robust Optimization Algorithm", Conference IEEE APS 2016, Jun. 2016, Fajardo (Puerto-Rico), United States, (2016).
S. Olhede et al., "The Hilbert spectrum via wavelet projections", Proceedings of the Royal Society A: Mathematical, Physical and Engineering Sciences, 460, pp. 955-975, (2004).
F. Tyan et al., "Generation of Random Road Profiles", Journal of Advanced Engineering, vol. 4, No. 2, pp. 151-156, (Apr. 2009).
T. Zhangi et al., "Wavelet-based analysis of 60 GHz Doppler radar for non-stationary vital sign monitoring", 11th European Conference on Antennas and Propagation (EUCAP) IEEE, (2017).
Written Opinion corresponding to International application No. PCT/EP2018/069065, dated Oct. 1, 2018, 5 pages.
International Search Report corresponding to International application No. PCT/EP2018/069065, dated Oct. 1, 2018, 4 pages.
Yongfeng Yang et al., "Application of Empirical Mode Decomposition in Vibration Analysis", National Defense Industry Press, dated Nov. 30, 2013, pp. 17-19.
Chinese Second Office Action in English Corresponding to Chinese Application No. 201880046547.1, dated Sep. 7, 2022, 20 pages.

* cited by examiner

FIG. 4

SYSTEM AND METHOD FOR RADAR-BASED DETERMINATION OF A NUMBER OF PASSENGERS INSIDE A VEHICLE PASSENGER COMPARTMENT

TECHNICAL FIELD

The invention relates to a method of operating a radar sensor system for determining a number of passengers in a vehicle passenger compartment, and to a radar sensor system automatically executing such method.

BACKGROUND OF THE INVENTION

In the technical field of passenger transportation, and in particular in automotive technology, for quite many applications it is mandatory to detect whether there is a person located on a seat or not. To this end, it has been proposed in the art to use radar technology for seat occupant detection systems. Occupancy sensors based on radar technology offer advantages in comparison to other occupancy detection methods as their operation is contact-free and can be unnoticeable for vehicle occupants. Moreover, radar sensors can easily be integrated in the vehicle interior, for example behind plastic covers and textiles.

By way of example, international application WO 2015/140333 A1 describes a method for ascertaining whether an unattended child is present within an automotive vehicle, using a radar sensor system comprising a transmitter and at least one sensor and processing circuitry and exploiting a breathing motion detected by radar signals, for instance by applying autocorrelation and peak finding. The method comprises: illuminating at least one occupiable position within the vehicle with radiation, the radiation exhibiting a single frequency or multiple frequencies; generating radar sensor signals from radiation reflected as a result of the transmitted radiation, a plurality of the radar sensor signals corresponding to different frequencies; operating the processing circuitry for generating, based on the radar sensor signals, a first indicator value, the first indicator value indicating a degree of motion associated with the occupiable position; determining whether the first indicator value satisfies a first predetermined criteria; if the first indicator value satisfies the first predetermined criteria, generating, based on radar sensor signals, a second indicator value, the second indicator value indicating a degree of repetitive pattern within the radar sensor signals; and determining that an unattended child is present within the automotive vehicle if the second indicator value satisfies a second predetermined criteria. The second indicator value may comprise a breathing signature indicative of the extent to which the sensor signals indicate that motion indicative of infant breathing child is detected.

In the article "*Non-Contact Estimation at 60 GHz for Human Vital Signs Monitoring Using a Robust Optimization Algorithm*" by Ting Zhang et al., Conference IEEE APS 2016, June 2016, Fajardo (Porto-Rico), United States, 2016, AP-S/URSI 2016. <hal-01340613>, an approach to estimate body movements related to vital activities by means of a 60 GHz Doppler radar is described, using robust optimization algorithms including signal autocorrelation analysis in order to extract heart-rate and breathing information from the radar signals.

It is therefore known in the art that a presence of a single passenger can be detected by conducting electromagnetic measurements, such as Doppler radar techniques to measure, for instance, the passenger's breathing or heartbeat. Unfortunately, received radar signals are corrupted with noise if, for instance, a vehicle is moving over a rough surface, in the presence of strong wind gusts or in the presence of engine vibrations. This noise, which could be of high amplitude compared to the signal of a passenger that is desired to detect will inevitably lead to detection errors.

In the technical field of automotive technology, for many applications it is further mandatory to determine a number of passengers that are present in a vehicle passenger compartment. Information on the number of passengers can e.g. be utilized in a system to prevent that small children and infants are left behind. For Advanced Driver Assistance Systems (ADAS) the number of passengers can be a valuable information. Other conceivable applications are the technical fields of local public transport, trains or aircrafts, for instance for avoiding overcrowding in trains, buses, and so forth.

For instance, international application WO 2016/038148 A1 describes a method for sensing occupancy status within an automotive vehicle. The method uses a radar sensor system comprising an antenna system, at least one sensor and processing circuitry. The method includes illuminating, by using the antenna system, at least one occupiable position within the vehicle with an outgoing radar signal, and receiving, by using the at least one sensor, at least one sensor signal that has been reflected as a result of the outgoing radar signal. The method further comprises obtaining accelerometer data value from at least one accelerometer, wherein the accelerometer data contain information regarding vibration or motion of the automotive vehicle and supplies the accelerometer data to the processing circuitry. The processing circuitry is being operated for generating, based on the at least one sensor signal and on the accelerometer data, one or more occupancy status signals, wherein the occupancy status signal indicates a property that is related to the at least one occupiable position.

Further, in the article by Zhangi, Ting et al. "*Wavelet-based analysis of 60 GHz Doppler radar for non-stationary vital sign monitoring*", 11th European Conference on Antennas and Propagation (EUCAP) IEEE, 2017, a Doppler-radar implementation at 60 GHz is proposed for contactless monitoring of vital signs (respiration and heartbeat) in order to provide constant monitoring of elderly people, to avoid accidents, and to reduce costs related to hospitalization. A real-time detection of vital signs is said to be believed to offer important information on the health condition of the patient, thus preventing critical events or acting in a timely and effective manner after them. In order to provide a real-time detection of non-stationary vital signs and critical events, an estimation technique is used by means of a wavelet transform of the received signals. Moreover, the amplitudes of the relevant vital movements can be deduced by the wavelet transform so as to distinguish the useful signal from noises and non-desired movements.

SUMMARY

It is therefore an object of the invention to provide a universal, non-contact method of detection with high accuracy and reliability that enables estimating the number of passengers present inside a stationary, or moving, vehicle passenger compartment.

In one aspect of the present invention, the object may be achieved by a method of operating a radar sensor system for determining a number of passengers in a vehicle passenger compartment. The radar sensor system includes a radar transmitting unit having at least one radar transmitting antenna and being configured for transmitting radar waves towards the vehicle passenger compartment, a radar receiving unit having at least one radar receiving antenna and being configured for receiving radar waves that have been transmitted by the radar transmitter unit and have been reflected by a passenger or passengers that are present in the vehicle passenger compartment, and an evaluation and control unit that is at least configured for evaluating Doppler information from the radar waves received by the radar receiving unit.

The method comprises at least steps of:
operate the radar transmitting unit for transmitting radar waves towards the vehicle passenger compartment,
operate the radar receiving unit for receiving radar waves that have been transmitted by the radar transmitting unit and that have been reflected by a passenger or by passengers being present in the vehicle passenger compartment,
operate the radar receiving unit for generating received radar signals from the received radar waves,
mathematically decompose the received radar signals into a plurality of received signal components, wherein each received signal component has a different value regarding at least one characteristic parameter,
provide values of the received signal components regarding the at least one characteristic parameter to a classifier that has been trained by supervised learning using data representing a plurality of scenarios with different numbers of passengers in the vehicle passenger compartment,
based on the provided values of the received signal components regarding the at least one characteristic parameter, identify one of the trained scenarios, and
generate an output signal that is indicative of the identified scenario.

The phrases "configured to" and "configured for", as used in this application, shall in particular be understood as being specifically programmed, laid out, furnished or arranged. The term "vehicle", as used in this application, shall particularly be understood to encompass passenger cars, trucks, buses, aircrafts and ferry boats. The phrase "evaluating Doppler information", as used in this application, shall in particular be understood as evaluating received radar waves for movement detection purposes.

By using the proposed method, it can be possible to detect and extract human characteristics in the noisy radar signals received by the at least one interior radar receiving antenna. The trained classifier will be capable of classifying the received radar signals based on presence or absence of these characteristic Doppler features, i.e. vital signs such as breathing or heartbeat. Further, with the proposed method the human characteristics can be detected in a non-stationary scenery, wherein the radar waves received by the at least one interior radar receiving antenna are contaminated by noise, and a clear distinction between noise and a living creature being present in the vehicle passenger compartment can be accomplished.

Appropriate classifiers that can be trained by supervised learning are readily available as commercial products, for instance as a MATLAB® module.

Preferably, the radar transmitting unit is configured for transmitting radar waves towards such regions in the vehicle passenger compartment in which breast regions and/or abdominal regions of potential passengers can be expected from positions of seats within the vehicle passenger compartment.

In preferred embodiments, the step of mathematically decomposing the received radar signals comprises to perform a discrete wavelet transform. Further, the at least one characteristic parameter is formed by a level of the wavelets, and the value regarding the at least one characteristic parameter is given by the individual energy contained in a specific level of the wavelets.

Wavelet-based analysis of a breathing signal is known in the art of vital sign monitoring, for instance from the article by Zhangi, Ting et al. "*Wavelet-based analysis of 60 GHz Doppler radar for non-stationary vital sign monitoring*", which has been cited as prior art before and which shall hereby be incorporated by reference in its entirety with effect for those jurisdictions permitting incorporation by reference.

Wavelet transform are a well-known tool for processing of time-dependent signals, and detailed description can be found in textbooks such as, by way of example, D. B. Percival and A. T. Walden: "*Wavelet Methods for Time Series Analysis*". Cambridge Series in Statistical and Probabilistic Mathematics, Cambridge University Press, 2000 (ISBN: 9780521640688).

An important property of the wavelet transform is the conservation of energy $$\|X\|^2 = \sum_{j=1}^{J_0} \|W_j\|^2 + \|V_{J_0}\|^2$$

wherein X is the received radar signal, $W_j$ is the $j^{th}$ level wavelet and $V_{J_0}$ is the $J_0^{th}$ level scaling filter. This means that the energy of the received radar signal is distributed among the resulting levels of the decomposition. Advantageously, it has been determined that there is a high probability that the energy coming from living sources, e.g. breathing, heartbeat, blood flow, and so on, is distributed to some specific levels of the decomposition, whereas the energy of the noise is distributed among other levels.

Preferably, the discrete wavelet transform to be performed in the method step is the maximum-overlap discrete wavelet transform (MODWT). MODWT is described in detail in the article by S. Olhede and A. T. Walden, "*The Hilbert spectrum via wavelet projections*", Proceedings of the Royal Society A: Mathematical, Physical and Engineering Sciences, 460, 955-975 (2004), which shall hereby be incorporated by reference in its entirety with effect for those jurisdictions permitting incorporation by reference.

In preferred embodiments, the step of mathematically decomposing the received radar signals comprises to perform a discrete wavelet transform, and further comprises a step of calculating the Hilbert transform for different levels of the wavelets to determine the at least one characteristic parameter that is given by an instantaneous frequency of the different levels of the wavelets.

There is a high probability that values for the characteristic parameter in the frequency domain, i.e. the instantaneous frequency, will be distributed for radar signals reflected by living beings characteristically within some specific ranges, whereas values for the instantaneous frequency from noise will be distributed among some other ranges.

Preferably, the step of mathematically decomposing the received radar signals comprises to perform a discrete Fourier transform. Herein, the at least one characteristic parameter is given by the frequency, and the value regarding the at least one characteristic parameter is given by a Fourier coefficient. As described before, it is advantageous for purposes of the system and method described herein that there is a high probability that values of signal components from human beings and signal components from unanimated objects and from noise generated by exterior events will distribute differently with regard to the at least one characteristic parameter, and thus can be used for distinguishing between one or several passengers present in the vehicle passenger compartment and noise generated by exterior events.

Preferably, the step of identifying one of the trained scenarios is executed by the classifier, which is formed by a support vector machine or a neural network. In this way, a trained classifier for identifying one of the trained scenarios can readily be provided.

Preferably, the data representing the various scenarios used for training the classifier comprise data simulating at least one road roughness condition. By that, the classifier can be effectively trained under realistic conditions, and a high accuracy rate for identifying a scenario with a specific number of passengers inside the vehicle passenger compartment can be achieved.

In preferred embodiments of the method, wherein the vehicle passenger compartment is a passenger car compartment, the step of providing values of the received signal components regarding the at least one characteristic parameter to a classifier that has been trained by supervised learning using data representing a plurality of scenarios with different numbers of passengers comprises a step of training the classifier with a plurality of scenarios, each one of the scenarios at least including:
  a driver's seat,
  a passenger front seat, and
  a three-seat rear bench.

Herein, in the various scenarios a number of passengers is varied starting from a driver occupying the driver's seat and one passenger occupying one of the other seats, with the other seats being unoccupied, adding another passenger occupying another one of the other seats, up to a driver occupying the driver's seat and four passengers occupying the other seats. In this way, an effective method of determining a number of passengers in a passenger car compartment can be provided. It should be noted that virtual (simulated) training data can be used as well to train the system.

In another aspect of the invention, a radar sensor system for determining a number of passengers in a vehicle passenger compartment is provided. The radar sensor system includes a radar transmitting unit having at least one radar transmitting antenna and being configured for transmitting radar waves towards the vehicle passenger compartment. The radar sensor system further comprises a radar receiving unit having at least one radar receiving antenna and being configured for receiving radar waves that have been transmitted by the radar transmitter unit and that have been reflected by passengers that are present in the vehicle passenger compartment. Moreover, the radar sensor system includes an evaluation and control unit that is configured for evaluating Doppler information from the radar waves received by the radar receiving unit and for automatically executing steps of the method disclosed herein.

The benefits described in context with the method proposed herein apply to the radar sensor system to the full extent.

Preferably, the evaluation and control unit comprises a processor unit and a digital data memory unit to which the processor unit has data access. In this way, the steps of the method disclosed herein can be performed within the radar sensor system to ensure a fast and undisturbed signal processing and evaluation.

Preferably, a radar carrier frequency of the transmitted radar waves lies in a frequency range between 2 GHz and 130 GHz, and more preferably in the frequency range between 57 GHz and 64 GHz. In this way, a sufficient spatial resolution can be achieved for the valuated Doppler information by the radar sensor system in an economic manner.

In yet another aspect of the invention, a non-transitory computer-readable medium having a software module for controlling automatic execution of the method disclosed herein is provided.

The method steps to be conducted are converted into a program code of the software module, wherein the program code is implementable in the non-transitory computer-readable medium (digital memory unit) of the radar sensor system or a separate control unit and is executable by a processor unit of the radar sensor system or a separate control unit. Preferably, the digital memory unit and/or processor unit may be a digital memory unit and/or a processing unit of the control and evaluation unit of the radar sensor system. The processor unit may, alternatively or supplementary, be another processor unit that is especially assigned to execute at least some of the method steps.

The software module can enable a robust and reliable automatic execution of the method and can allow for a fast modification of method steps if desired.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description below describes embodiments of the invention in connection with the figures.

BRIEF DESCRIPTION OF THE DRAWINGS

Further details and advantages of the present invention will be apparent from the following detailed description of not limiting embodiments with reference to the attached drawing, wherein.

DESCRIPTION OF THE ILLUSTRATED EMBODIMENTS

Figure 1:
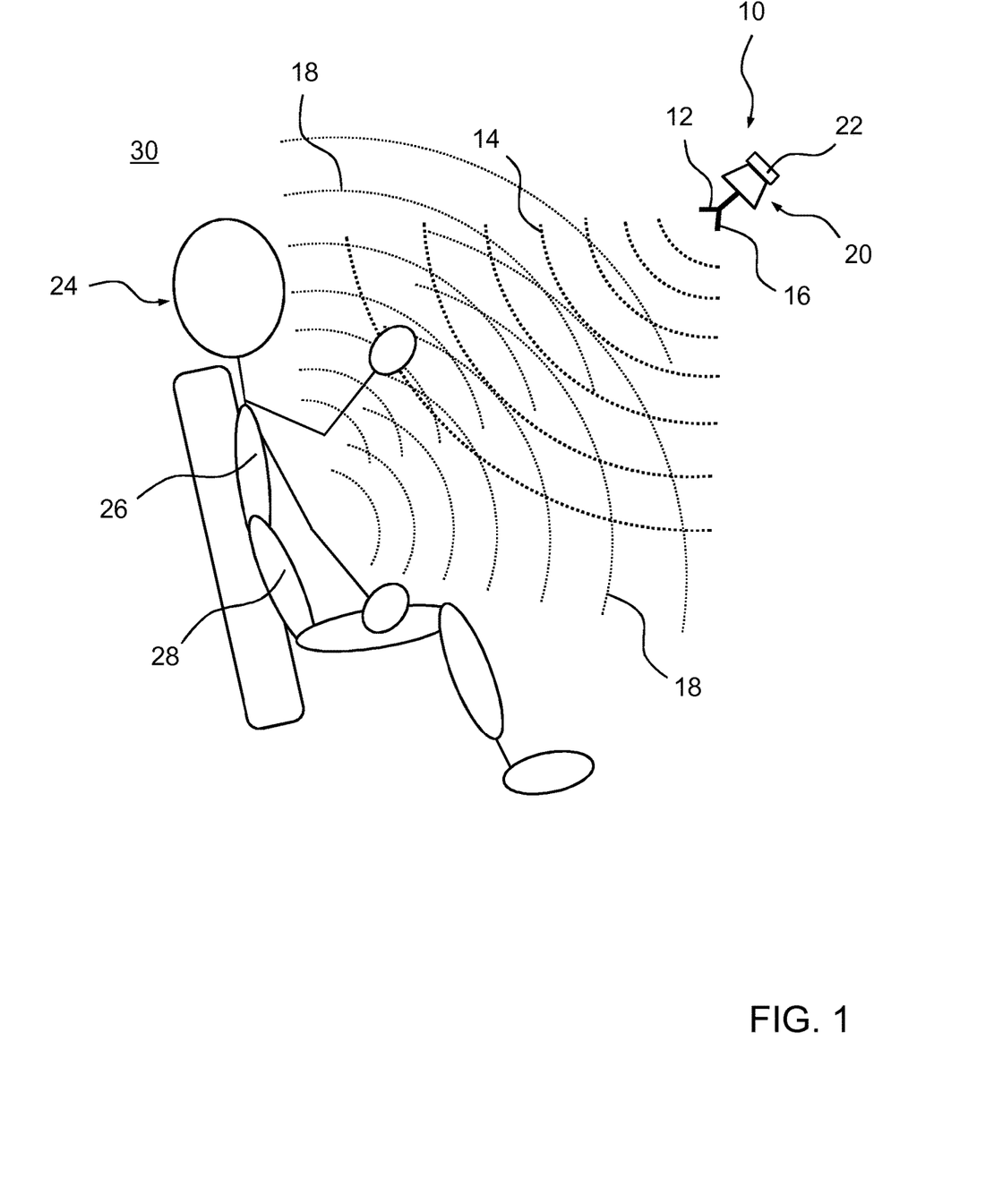
FIG. 1 schematically illustrates, in a side view, a configuration of an embodiment of a radar sensor system in accordance with the invention while executing an operation method for determining a number of passengers in a vehicle passenger compartment.

FIG. 1 schematically illustrates a configuration of an embodiment of the radar sensor system 10 in accordance with the invention while executing an operating method for determining a number of passengers in a vehicle passenger compartment 30 that is formed by a passenger car compartment of a sedan-type passenger car. FIG. 1 shows a side view of a passenger 24 occupying a driver's seat. More passengers (not shown) may be present, occupying the passenger front seat and/or one seat each of a three-seat rear bench of the passenger car.

The radar sensor system 10 comprises a radar transmitting unit having two radar transmitting antennas. The radar transmitting unit is configured for supplying the two radar transmitting antennas with radar waves having a radar carrier frequency. A front radar transmitting antenna 12 is installed in a front region of the headliner, and a rear radar transmitting antenna (not shown) is installed in a center region of the headliner. Both the radar transmitting antennas 12 are rearward directed. The radar transmitting unit is configured for transmitting radar waves 14 via the radar transmitting antennas 12 towards the vehicle passenger compartment 30, and more specifically towards a chest 26 and an abdominal region 28 of the driver and other potentially present passengers. In this specific embodiment, a radar carrier frequency of the radar sensor system 10 is selectable within a radar frequency range between 2 GHz and 130 GHz, and more preferably in the frequency range between 57 GHz and 64 GHz.

The radar sensor system 10 further includes a radar receiving unit having two radar receiving antennas 16 and being configured for receiving radar waves 18 that have been transmitted by the radar transmitter unit and have been reflected by one or more of the passengers 24 that are present in the vehicle passenger compartment 30.

Each of the radar transmitting antennas 12 is paired with one of the radar receiving antennas 16 to be co-located in a monostatic arrangement, which is indicated in FIG. 1 by use of a combined symbol. In this specific embodiment, the radar transmitter unit and the radar receiving unit form an integral part of a transceiver unit 20, sharing common electronic circuitry and a common housing. In other embodiments, the radar transmitter unit and the radar receiving unit may be designed as separate units.

Moreover, the radar sensor system 10 comprises an evaluation and control unit 22 that is configured for evaluating Doppler information from the radar waves 18 received by the radar receiving unit. The evaluation and control unit 22 is connected to the radar transmitting unit for controlling operation of the radar transmitting unit. The evaluation and control unit 22 is also connected to the radar receiving unit for receiving radar signals generated by the radar receiving unit. The evaluation and control unit 22 comprises a processor unit and a digital data memory unit (not shown) to which the processor unit has data access. The evaluation and control unit 22 is configured for recording the received radar signals generated by the radar receiving unit in the digital data memory unit. Moreover, the evaluation and control unit 22 includes a classifier for signal processing, as will be described hereinafter.

Figure 4:
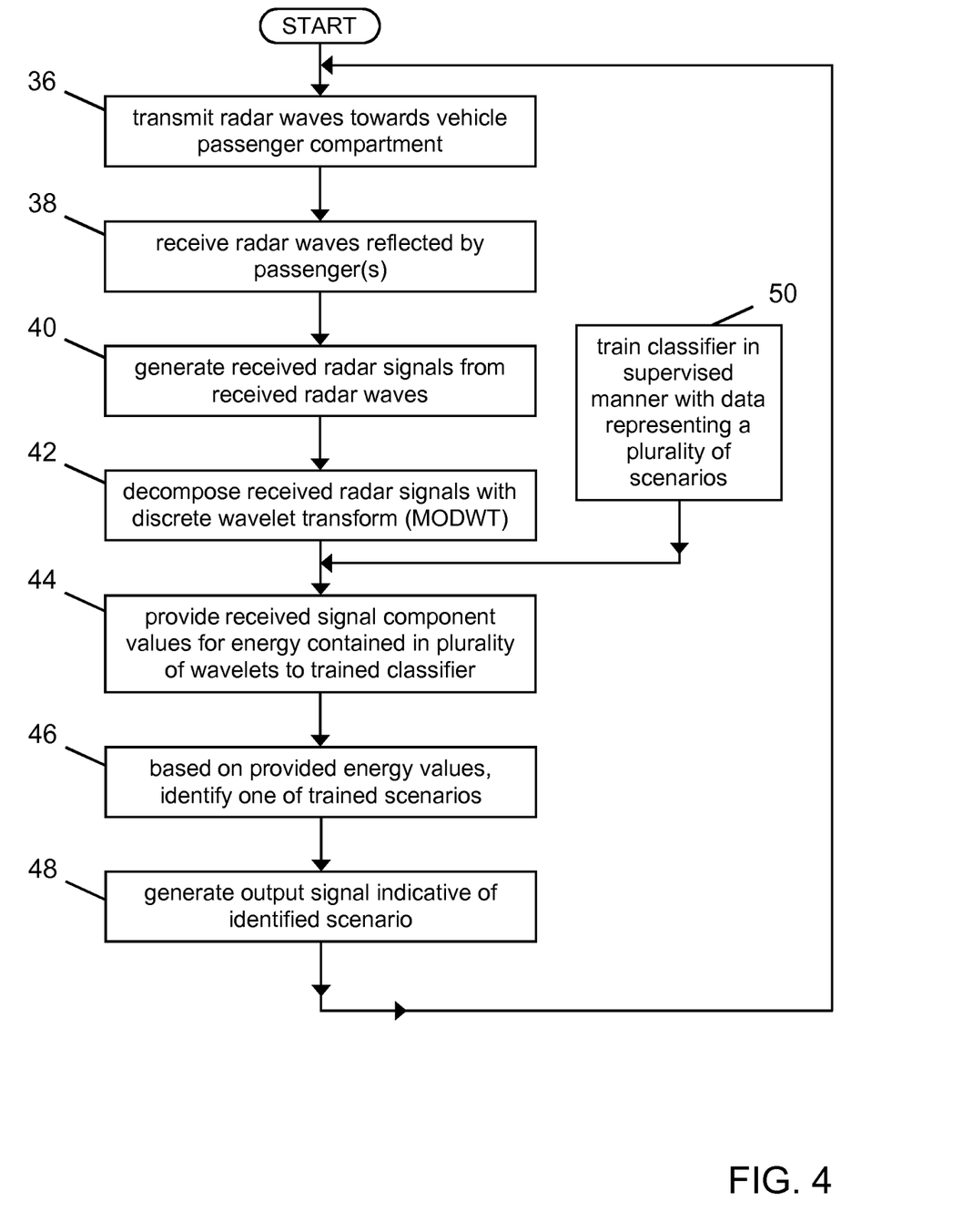
FIG. 4 is a flowchart of an embodiment of the method in accordance with the invention of operating the radar sensor system pursuant to FIG. 1 for determining a number of passengers in a vehicle passenger compartment.

In the following, an embodiment of a method of operating the radar sensor system 10 for determining a number of passengers 24 in the vehicle passenger compartment 30 will be described with reference to FIG. 1 and FIG. 4, which provides a flowchart of the method. In preparation of operating the radar sensor system 10, it shall be understood that all involved units and devices are in an operational state and configured as illustrated in FIG. 1.

In order to be able to carry out the method automatically and in a controlled way, the evaluation and control unit 22 comprises a software module. The method steps to be conducted are converted into a program code of the software module. The program code is implemented in the digital data memory unit (non-transitory computer-readable medium) of the evaluation and control unit 22 and is executable by the processor unit of the evaluation and control unit 22.

Execution of the method may be initiated by turning on the passenger car ignition. In a first step 36 of the method, the radar transmitting unit is operated by the evaluation and control unit 22 for transmitting radar waves 14 towards the vehicle passenger compartment 30. In another step 38, the radar receiving unit is operated by the evaluation and control unit 22 for receiving radar waves 18 that have been transmitted by the radar transmitting unit and that have been reflected by a passenger 24 or by passengers that are present in the vehicle passenger compartment 30, and, more specifically, have been reflected by the chest and the abdominal region of the passenger 24 or the passengers.

In another step 40, the radar receiving unit is operated by the evaluation and control unit 22 for generating received radar signals 32 from the received radar waves 18. The step 40 of generating the received radar signals 32 includes low pass filtering and mixing in a conventional manner.

Figure 2:
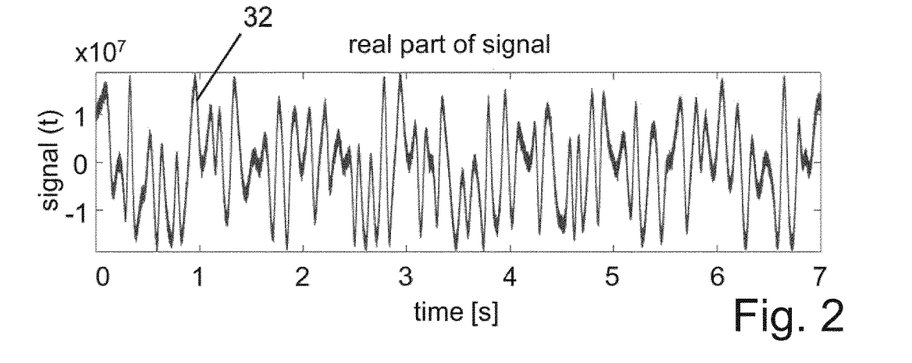
FIG. 2 shows a plot of an in-phase radar signal received by a radar receiving antenna of the radar sensor system pursuant to FIG. 1 observing a breathing motion of two passengers in the presence of vibrations of a car driving over street bumps.

A plot of the received in-phase radar signal 32 while observing a breathing motion of two passengers 24 (only one passenger shown) in the presence of vibrations of the passenger car driving over street bumps is shown in FIG. 2.

Figure 3:
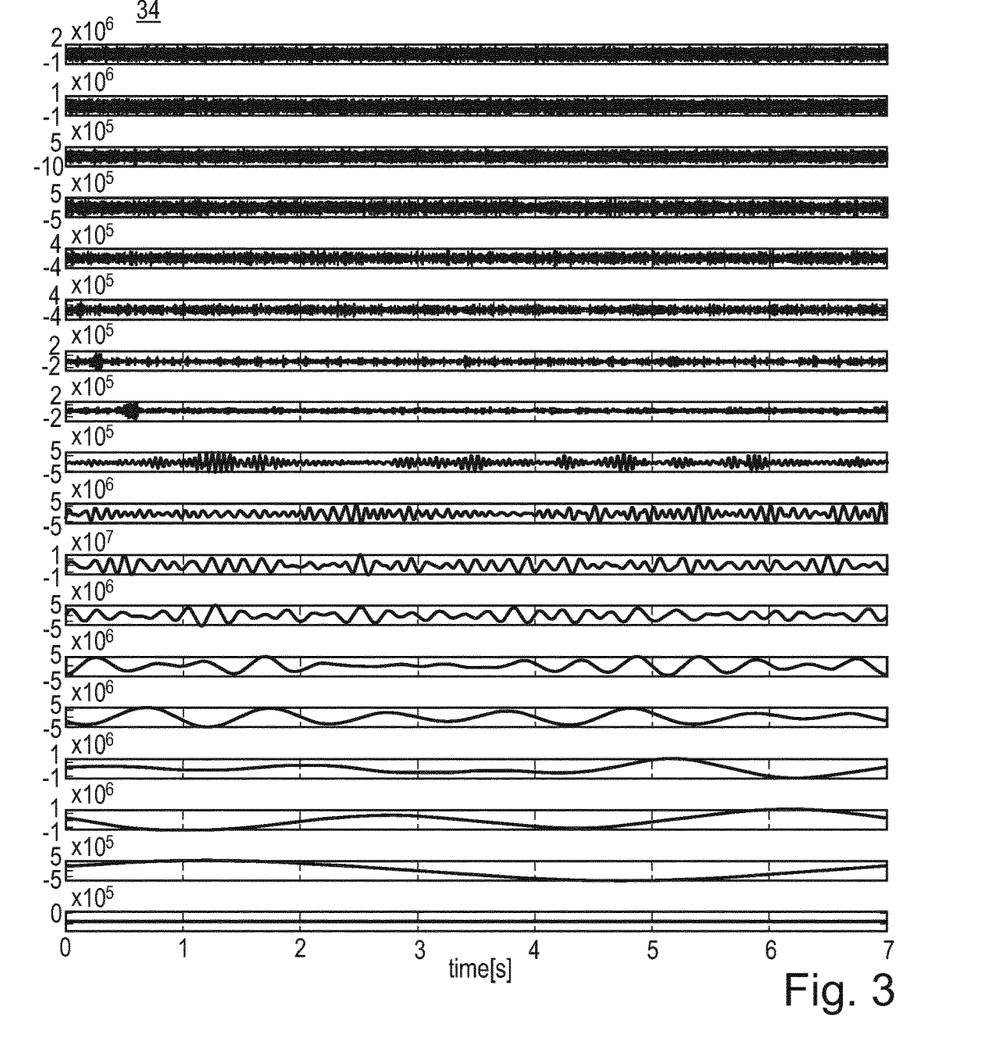
FIG. 3 shows a plot of a maximal overlap discrete wavelet transform of the radar signal pursuant to FIG. 2.

The received radar signals 32 are mathematically decomposed by the evaluation and control unit 22 into a plurality of received signal components in a next step 42. The step 42 of mathematically decomposing the received radar signals 32 comprises to perform a maximum-overlap discrete wavelet transform (MODWT) 34 (FIG. 3). In this specific embodiment, the well-known orthogonal Daubechies wavelets are used, having 45 vanishing moments, but in principle other wavelet transforms may be employed that appear suitable to those skilled in the art.

Each received signal component of the plurality of received signal components has a different value regarding a characteristic parameter that is unique among the plurality of received signal components, the characteristic parameter given by a level of the Daubechies wavelets. The value regarding the characteristic parameter is given by the individual energy contained in a specific level of the Daubechies wavelets.

Referring again to FIG. 4, the different values of the plurality of received signal components regarding the energy contained in a specific level of the Daubechies wavelets is provided as an input to the classifier of the evaluation and control unit 22 in another step 44 of the method. The classifier is formed by a support vector machine and has been trained by supervised learning using data representing a plurality of scenarios with different numbers of passengers 24 in the vehicle passenger compartment 30.

The training has been conducted in a preceding step 50. The data representing the various scenarios used for training the classifier comprised data simulating road roughness condition. Based on the article "*Generation of Random Road Profiles*" by Feng Tyan et al., Journal of Advanced Engineering 4.2 (2009), road roughness levels A to E have been implemented. Road roughness level C represents a vertical road profile with an average road roughness.

Further, in the various scenarios used for the step 50 of training the classifier a number of passengers 24 is varied, starting from a driver occupying the driver's seat and one passenger occupying one of the other seats, with the other seats being unoccupied, adding another passenger occupying another one of the other seats, up to a driver occupying the driver's seat and four passengers occupying the other seats.

A sufficient level of training has to be applied to the classifier for executing the method, but additional training data can be transferred to the classifier at any later point in time, for instance as a software update during passenger car maintenance, for improved accuracy in determining the number of passengers 24 present in the vehicle passenger compartment 30.

In another step 46 of the method, based on the different values of the plurality of received signal components regarding the energy contained in specific levels of the Daubechies wavelets, the classifier identifies one of the trained scenarios.

In a next step 48 of the method, the evaluation and control unit 22 generates an output signal that is indicative of the identified scenario. The output signal can be transferred to an ADAS of the passenger car for further use.

All received radar signals, values of the received signal components regarding the characteristic parameter and training data representing a plurality of scenarios with different numbers of passengers mentioned in this description can reside at least temporarily in the digital data memory unit of the evaluation and control unit 22 and can readily be retrieved by the processor unit of the evaluation and control unit 22.

The effectiveness of the proposed method has been examined by carrying out simulations, in which a different set of possible scenarios has been used, given by:

1. two passengers on the front seats,
2. one passenger and an empty seat, and
3. two empty seats.

The set of possible scenarios includes road roughness levels A to E in a first training data set, and roughness levels A to C in a second training data set.

Each passenger's breathing motion was simulated using random breathing frequencies, breathing amplitudes of 4 mm and 5 mm, respectively, and a radar cross section of each passenger's chest of 0.34 m². 1440 sets of received radar signals were simulated, using half of the data sets for the step of training the classifier in a supervised manner, and using the previously mentioned characteristic parameter and the Daubechies wavelet transform having 45 vanishing moments. The other half of the data sets was used for examining the method effectiveness.

For the first training data set with road roughness classes A to E, a portion of 82.9% for a scenario being properly identified by the classifier could be achieved. For the second training data set with road roughness classes A to C, the respective portion was 99%.

While embodiments of the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A method of operating a radar sensor system for determining a number of passengers in a vehicle passenger compartment, the radar sensor system including a radar transmitting unit having at least one radar transmitting antenna and being configured for transmitting radar waves towards the vehicle passenger compartment, a radar receiving unit having at least one radar receiving antenna and being configured for receiving radar waves that have been transmitted by the radar transmitter unit and have been reflected by passengers that are present in the vehicle passenger compartment, and an evaluation and control unit that is at least configured for evaluating Doppler information from the radar waves received by the radar receiving unit, the method comprising at least steps of:

operating the radar transmitting unit for transmitting radar waves towards the vehicle passenger compartment, operating the radar receiving unit for receiving radar waves that have been transmitted by the radar transmitting unit and that have been reflected by a passenger or by passengers being present in the vehicle passenger compartment, operating the radar receiving unit for generating received radar signals from the received radar waves, mathematically decomposing the received radar signals into a plurality of received signal components, wherein each received signal component has a different value regarding at least one characteristic parameter, wherein the step of decomposing the received radar signals includes performing a discrete wavelet transform, and a step of calculating the Hilbert transform for different levels of the wavelets to determine the at least one characteristic parameter that is given by an instantaneous frequency of the different levels of the wavelets, providing values of the received signal components regarding the at least one characteristic parameter to a classifier that has been trained by supervised learning using data representing a plurality of scenarios with different numbers of passengers in the vehicle passenger compartment, based on the provided values of the received signal components regarding the at least one characteristic parameter, identifying one of the trained scenarios, and generating an output signal that is indicative of the identified scenario.

2. The method as claimed in claim 1, wherein the step of mathematically decomposing the received radar signals comprises performing a discrete wavelet transform, and wherein the at least one characteristic parameter is formed by a level of the wavelets, and the value regarding the at least one characteristic parameter is given by the individual energy contained in a specific level of the wavelets.

3. The method as claimed in claim 1, wherein the step of mathematically decomposing the received radar signals comprises performing a discrete Fourier transform, and wherein the at least one characteristic parameter is given by the frequency and the value regarding the at least one characteristic parameter is given by a Fourier coefficient.

4. The method as claimed in claim 1, wherein the step of identifying one of the trained scenarios is executed by the classifier, which is formed by a support vector machine or a neural network.

5. The method as claimed in claim 1, wherein the data representing the various scenarios used for training the classifier comprise data simulating at least one road roughness condition.

6. The method as claimed in claim 1, wherein the vehicle passenger compartment is a passenger car compartment, wherein the step of providing values of the received signal components regarding the at least one characteristic parameter to a classifier that has been trained by supervised learning using data representing a plurality of scenarios with different numbers of passengers comprises a step of training the classifier with a plurality of scenarios, at least including:

a driver's seat, a passenger front seat, and a three-seat rear bench, and wherein in the various scenarios a number of passengers is varied starting from a driver occupying the driver's seat and one passenger occupying one of the other seats, with the other seats being unoccupied, adding another passenger occupying another one of the other seats, up to a driver occupying the driver's seat and four passengers occupying the other seats.

7. A radar sensor system for determining a number of passengers in a vehicle passenger compartment, including:

a radar transmitting unit having at least one radar transmitting antenna and being configured for transmitting radar waves towards the vehicle passenger compartment, a radar receiving unit having at least one radar receiving antenna and being configured for receiving radar waves that have been transmitted by the radar transmitter unit and that have been reflected by passengers that are present in the vehicle passenger compartment, and an evaluation and control unit that is configured for evaluating Doppler information from the radar waves received by the radar receiving unit and for automatically executing the steps of the method as claimed in claim 1.

8. The radar sensor system as claimed in claim 7, wherein a radar carrier frequency of the transmitted radar waves lies in a frequency range between 2 GHz and 130 GHz.

9. A non-transitory computer-readable medium for controlling automatic execution of the method as claimed in claim 1, wherein the method steps are stored on the computer-readable medium a program code, wherein the computer-readable medium comprises a part of the radar sensor system or a separate control unit and the program code is executable by a processor unit of the radar sensor system or a separate control unit.

\* \* \* \* \*